(12) United States Patent
Leconte et al.

(10) Patent No.: US 11,662,948 B2
(45) Date of Patent: May 30, 2023

(54) NORFLASH SHARING

(71) Applicant: NXP USA, Inc., Austin, TX (US)

(72) Inventors: Loic Leconte, Vence (FR); Agathe Charligny, Antibes (FR); Regis Gaillard, Saint Jeannet (FR)

(73) Assignee: NXP USA, Inc., Austin, TX (US)

( * ) Notice: Subject to any disclaimer, the term of this patent is extended or adjusted under 35 U.S.C. 154(b) by 37 days.

(21) Appl. No.: 17/303,120

(22) Filed: May 20, 2021

(65) Prior Publication Data
US 2021/0397379 A1    Dec. 23, 2021

(30) Foreign Application Priority Data

Jun. 19, 2020 (EP) ..................................... 20305673

(51) Int. Cl.
*G06F 3/06*    (2006.01)

(52) U.S. Cl.
CPC .......... *G06F 3/0659* (2013.01); *G06F 3/0604* (2013.01); *G06F 3/0664* (2013.01); *G06F 3/0688* (2013.01)

(58) Field of Classification Search
CPC .... G06F 3/0659; G06F 3/0604; G06F 3/0664; G06F 3/0668
See application file for complete search history.

(56) References Cited

U.S. PATENT DOCUMENTS

| | | | |
|---|---|---|---|
| 6,574,142 B2 | 6/2003 | Gelke et al. | |
| 2015/0154132 A1 | 6/2015 | Tuers et al. | |
| 2016/0034406 A1* | 2/2016 | Hansson | G06F 13/1663 711/151 |
| 2017/0017412 A1* | 1/2017 | Luan | G06F 3/0673 |
| 2017/0060427 A1* | 3/2017 | Shen | G06F 3/0679 |
| 2018/0024772 A1* | 1/2018 | Madraswala | G06F 3/0679 711/103 |
| 2018/0095675 A1* | 4/2018 | Kachare | G06F 3/0688 |
| 2018/0275914 A1* | 9/2018 | Ke | G06F 3/061 |
| 2018/0341430 A1* | 11/2018 | Chiu | G06F 3/0679 |
| 2019/0056870 A1 | 2/2019 | Sun et al. | |
| 2019/0227753 A1 | 7/2019 | Zhu et al. | |
| 2021/0109674 A1* | 4/2021 | Boenapalli | G06F 3/0653 |

FOREIGN PATENT DOCUMENTS

EP     2538339 B1    2/2014

* cited by examiner

*Primary Examiner* — Edward J Dudek, Jr.

(57) ABSTRACT

A system on a chip allows external NorFlash memory sharing by multiple master devices. The system on a chip is configured to use an external NorFlash memory and includes a plurality of master devices and NorFlash virtualising circuity. The NorFlash virtualizing circuitry is configured to suspend a program operation or an erase operation being carried out on the external NorFlash memory, permit a read operation to be carried out on the NorFlash memory and then resume the suspended program operation or erase operation. Each master device of the plurality of master devices operates as a master to independently access the external NorFlash memory.

18 Claims, 7 Drawing Sheets

NORFLASH SHARING

CROSS-REFERENCE TO RELATED APPLICATIONS

This application claims the priority under 35 U.S.C. § 119 of European Patent application no. 20305673.4, filed on 19 Jun. 2020, the contents of which are incorporated by reference herein.

The present specification relates to memory sharing and methods of memory sharing for electronic equipment, devices and apparatus.

Many electronic devices include one or more data processors which typically use random access memory (RAM) or read only memory (ROM) of various types for various purposes, such as storing data or instructions or as working memory during program execution.

Various types of solid state memory devices are generally known. These include NorFlash and NandFlash memory devices. Generally, flash memory devices are non-volatile memory devices capable of being electronically erased and reprogrammed. NorFlash memory devices are so called because the individual memory cells are configured similarly to a logic NOR gate. Similarly NandFlash memory devices are so called because the individual memory cells are wired similarly to a logic NAND gate. There are various differences between NorFlash and NandFlash memories some of which may make one or the other be more beneficial in certain applications.

Reading from NorFlash may be similar to reading from random-access memory, and so many microprocessors can use Nor Flash memory to execute programs directly from NorFlash without having to be copied to local RAM. NorFlash may be programmed in a random-access manner similar to when it is read. Programming changes bits from a logical one to a zero, while bits that are already zero are left unchanged. However, erasure typically happens a block at a time, and resets all the bits in the erased block back to one.

NandFlash typically has higher storage capacity, better cost per bit, better active power and good write speed compared to NorFlash. NorFlash typically has lower storage capacity, better standby power and good read speed compared to NandFlash. The lower write speed of NorFlash is largely owing to the write process using erase and program cycles in which all bits are set to 1 during the erase operation and then bits are switched from 1 to 0 by the program operation. Hence, NandFlash may commonly be used in file storage applications whereas NorFlash may be commonly used in code execution applications.

Typically only a single master processor can interact with a NorFlash to read, write or execute direction from it. Difficulties can arise when multiple master processors try to use the same NorFlash.

EP-2538339 describes an arbitration scheme in which any master failing or closer to a fail metric is assigned the highest priority and is arbitrated in a round robin manner with other masters that have also been assigned the highest priority.

U.S. Pat. No. 6,574,142 describes an integrated circuit with an embedded flash that can be accessed by several embedded masters.

The present disclosure relates to issues arising from permitting multiple masters to access external NorFlash in an efficient manner.

According to a first aspect of the present disclosure, there is provided a system on a chip configured to use an external NorFlash memory, wherein the system on a chip comprises: a plurality of master devices; and NorFlash virtualising circuity configured to suspend a program operation or an erase operation being carried out on the external NorFlash memory, permit a read operation to be carried out on the NorFlash memory and then resume the suspended program operation or erase operation, and wherein each master device of the plurality of master devices operates as a master to independently access the external NorFlash memory.

In one or more embodiments, the NorFlash virtualising circuitry may comprises a plurality of pairs of queues, each pair of queues being associated with a respective one of the plurality of master devices. Each pair of queues may comprise a read request queue and a write request queue arranged to receive read requests and write requests from a one of the plurality of master devices.

In one or more embodiments one or a plurality of the plurality of master devices may be a processor.

In one or more embodiments one or a plurality of the plurality of master devices may be a direct memory access (DMA) controller.

In one or more embodiments, each read request queue may have a read request timer associated therewith. Each read request queue may be configured to either: reset the read request timer if the read request which started the timer is scheduled before the read request timer expires; or increase a read request timer expiration counter if the read request that started the timer is not scheduled before the read request timer expires. Each read request queue may be further configured to further increase the read request timer expiration counter each time another read request timer associated with another read request queue expires.

In one or more embodiments, each write request queue may have a write request timer associated therewith. Each write request queue may be configured to either: reset the write request timer if the write request that started the timer is scheduled before the write request timer expires; or increase a write request timer expiration counter if the write request that started the timer is not scheduled before the write request timer expires. Each write request queue may be further configured to further increase the write request timer expiration counter each time another write request timer associated with another write request queue expires.

In one or more embodiments, the NorFlash virtualising circuitry may include a scheduler configured to schedule a next highest priority request from a plurality of read requests and/or a plurality of write requests from the plurality of master devices.

In one or more embodiments, the scheduler may be configured to determine which of the plurality of read requests and/or the plurality of write requests is the next highest priority request based on one or more of: read requests having priority over write requests; a write request only being scheduled if there is no ongoing program operation on the external NorFlash memory; a write request having higher priority than a read request, if: a write request timer has expired and no read request timer has expired; or a write request timer has expired and an associated write request timer expiration counter is greater than any read request timer expiration counter; or a write request timer for a write request has expired and the write request having higher priority than a read request if the number of read requests that have been scheduled after a last write request exceeds a maximum.

In one or more embodiments, the NorFlash virtualizing circuitry may further comprise a request processor which handles a current highest priority request. The request processor may be configured to: suspend any program operation or erase operation that is currently ongoing on the external NorFlash memory when the current highest priority request is a read request; and/or suspend any erase operation that is currently ongoing on the external NorFlash memory when the current highest priority request is a write request.

In one or more embodiments, the request processor may be further configured to: complete any program operation that is currently ongoing on the external NorFlash memory when there is a write request that has not been scheduled for a time greater than a maximum pending time.

In one or more embodiments, the request processor may be further configured to suspend a program operation currently ongoing on the external NorFlash memory, by causing a suspend program command to be sent to the external NorFlash memory and then waiting for the program operation to be suspended.

In one or more embodiments, the request processor may be further configured to suspend an erase operation currently ongoing on the external NorFlash memory, by causing a suspend erase command to be sent to the external NorFlash memory and then waiting for the erase operation to be suspended.

In one or more embodiments, the NorFlash virtualizing circuitry may further comprise a command look up table storing a plurality of NorFlash command codes for a plurality of NorFlash commands for the external NorFlash memory and wherein the plurality of NorFlash commands includes one or more of: read; erase; write enable; program; program suspend; erase suspend; program resume; erase resume; and read status.

In one or more embodiments, the NorFlash virtualizing circuitry may further comprise a plurality of sets of status registers, each set of status registers being for a respective master device of the plurality of master devices. Each set of status registers may comprise a plurality of status registers or a single status register.

In one or more embodiments, the system on a chip may further comprise a serializer arranged to communicate with the external NorFlash memory.

In one or more embodiments, the scheduler may implement a first finite state machine and/or the request processor may implement a second finite state machine.

A second aspect of the present disclosure provides a package including a semiconductor integrated circuit, wherein the semiconductor integrated circuit is configured to provide the system on a chip of the preceding aspect and also any preferred features thereof.

A third aspect of the present disclosure provides an electronic system, comprising: the system on a chip of the first aspect or the package of the second aspect and an external NorFlash memory in communication with the system on a chip.

According to a fourth aspect of the present disclosure, there is provided a method of a plurality of master devices of a system on a chip using an external NorFlash memory, comprising: suspending a program operation or an erase operation being carried out on the external NorFlash memory; permitting a read operation to be carried out on the NorFlash memory; and then resuming the suspended program operation or erase operation, so that each master device of the plurality of master devices operates as a master to independently access the external NorFlash memory.

Features of the first aspect may also be counterpart features for the fourth aspect.

Embodiments of the invention will now be described in detail, by way of example only, and with reference to the accompanying drawings, in which.

Similar items in the different Figures share like reference signs unless indicated otherwise.

Figure 1:
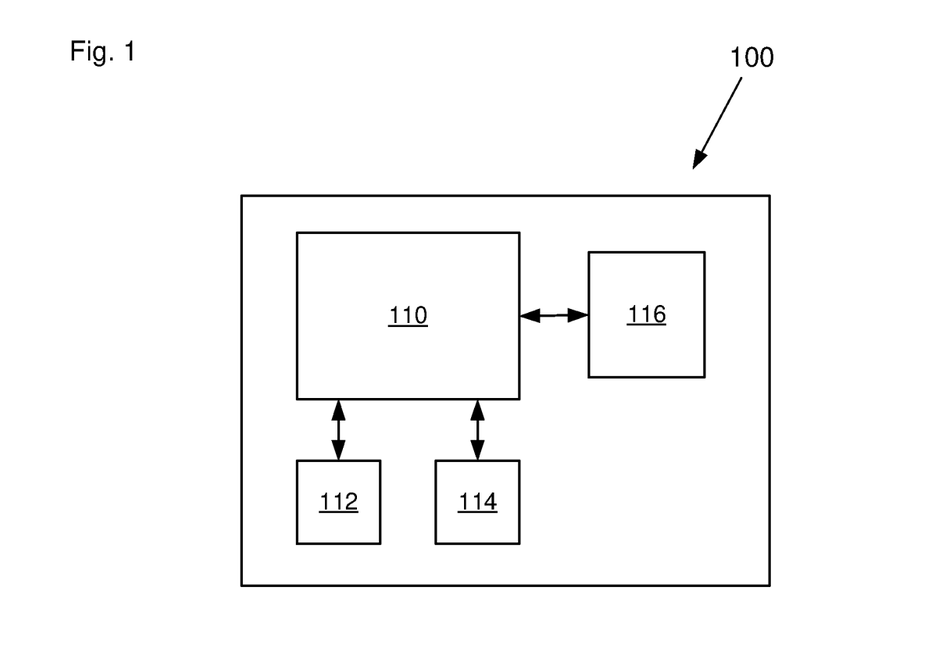
FIG. 1 shows a schematic block diagram of an example electronic device.

With reference to FIG. 1, there is shown a schematic block diagram of an electronic device 100. With reference to FIG. 1 there is shown a schematic block diagram of an electronic device 100 according to an aspect of the disclosure. The electronic device 100 may be of any kind, but in particular may be an automotive electronic device or an industrial electronic device.

As illustrated in FIG. 1, the electronic device 100 includes a system on a chip (SOC) 110. The SOC 110 includes at least two master devices, such as two processors, which may be of the same or differing types. However, the number of master devices is variable but typically the SOC will include at least two different master devices. The SOC 110 is in communication with at least one external NorFlash 112. Each master device has its own master-slave relationship with the same external NorFlash 112. The SOC 110 may also be in communication with one or more other external memory devices, such as NandFlash 114, or other types of solid state RAM or ROM. As the present disclosure relates in particular to the interactions between the SOC 110 and NorFlash 112, the other parts of the electronic device are schematically represented by block 116 which is also in communication with SOC 110. The remaining components 116 of the electronic device are not particularly limited and may include various components generally known in the art and will depend upon the specific application of the electronic device 100.

As described in greater detail below with reference to FIG. 2, the SOC is configured to permit the external NorFlash to operate with each processor acting as a master, and as if each master device was the only master device able to access the external NorFlash. In particular, the SOC may be configured to virtualise the physical external NorFlash memory.

Figure 2:
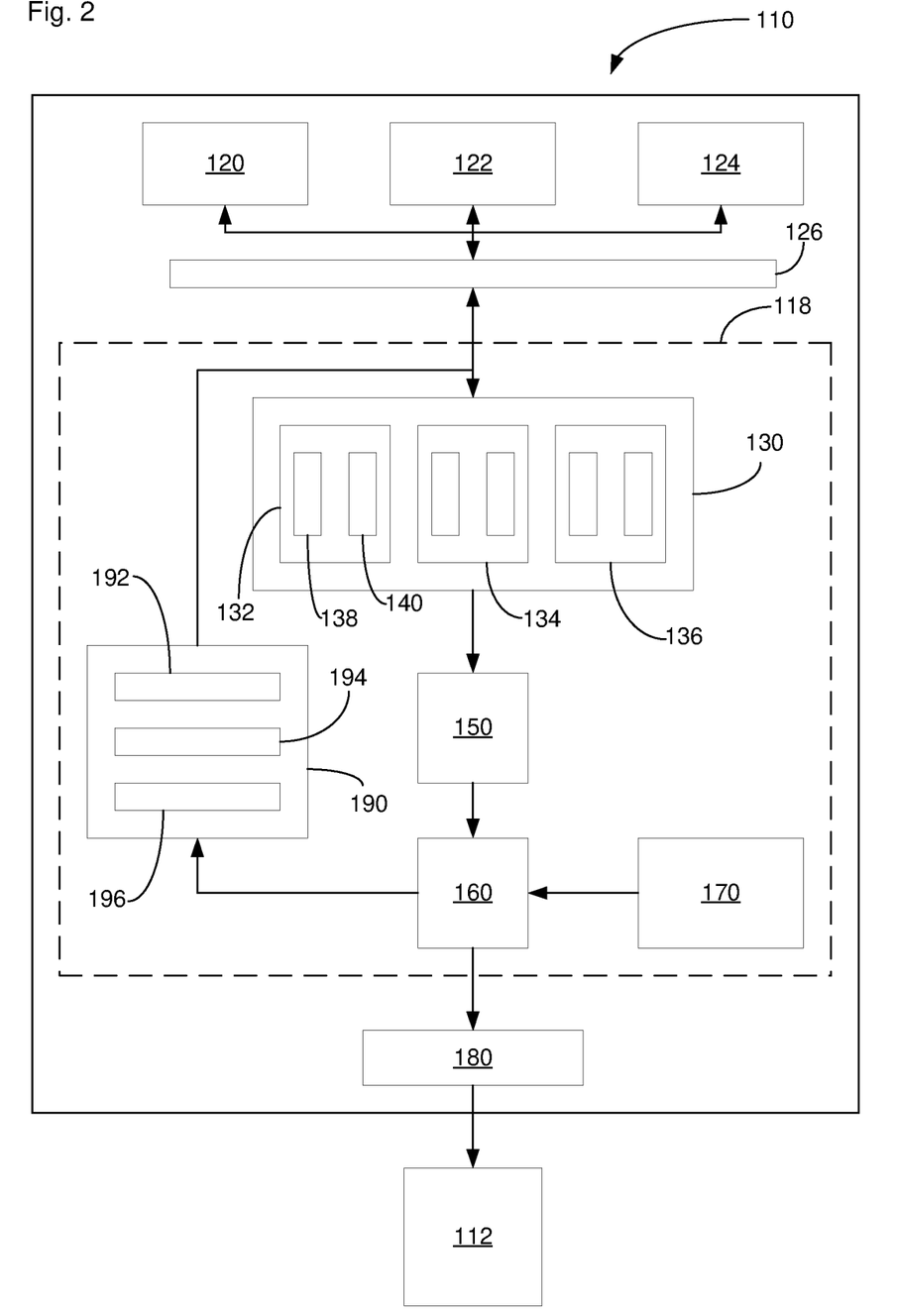
FIG. 2 shows a schematic block diagram of a system on a chip (SOC) and NORFlash memory that may be used in the electronic device illustrated in FIG. 1.

FIG. 2 shows the SOC 110 and NorFlash 112 of electronic device 100 alone and in greater detail.

As illustrated in FIG. 2, SOC 110 includes three different master devices 120, 122, 124. It will be appreciated that three master devices are shown by way of illustration only and that a greater or lesser number of master devices may be provided. The type of the master device is not particularly limited and may include various processors, including central processor units (CPUs) and microprocessor units (MPUs), or direct memory access (DMA) controllers. For example a first processor 120 could be arranged to execute directly from external NorFlash 112. A second processor 122 could be arranged to read or copy data from the external NorFlash 112 if the NorFlash does not provide enough performance to achieve the benefits of executing in place. The third master device 124 may be a DMA controller.

The SOC 110 also includes an access control hardware layer 126 which is configured to ensure that each master device has access to the part of the external NorFlash that it is supposed to access. Hence a first one of the master devices cannot access a NorFlash space that has been dedicated to another one of the master devices. The access control layer 126 is connected to each of the master devices provides a bus by which any one of the master devices can communicate with the subsequent hardware on a multi-master and slave basis. That is, each of the master devices may act as a master controller independently of the others and the NorFlash 112 may act as a slave for any one of the master devices acting as a master. For example, bus 126, may operate according to the Advanced Extensible Interface (AXI) protocol. The access control hardware layer 126 is also configured to enforce security rules to ensure that any one of the master devices can only access allowed NorFlash locations.

In general, the parts 118 of the SOC 110 between the access control layer 126 and a serializer 180 handle complex sequences to suspend more time consuming operations, like NorFlash PROGAM or ERASE commands, to permit READ operations to proceed, and then resuming the suspended operations so that multiple master devices may access the same external NorFlash. For example, this may permit multiple microprocessors to execute directly from external NorFlash 112.

The parts 118 of the SOC 110 between the access control interface 126 and the serializer 180 are also able automatically to schedule access to the external NorFlash 112 in such a way that a processor sees the NorFlash as a standard RAM with low performances. For example the bandwidth of a NorFlash can be up to about 360 MB/s for long enough bursts. Hence, sharing this between three masters means a bandwidth of about 100-200 MB/s which is significantly lower than the bandwidth for double data rate (DDR) memory devices.

The parts 118 are configured to virtualize accesses to external NorFlash 112 by several embedded master devices 120, 122, 124, and to ensure that more time consuming NorFlash operations, such as ERASE and PROGRAM, do not prevent the embedded master devices from having READ access to the external NorFlash 112. Hence parts 118 can be considered NorFlash virtualisation circuity of the SoC 110.

The access control layer 126 is in communication with a read/write queue module 130. The read/write queue module 130 provides a read request queue and a write request queue for each of the different processors. For example, as illustrated in FIG. 2, there is a first read/write queue 132 for the first processor 120, a second read/write queue 134 for the second processor 122, and a third read/write queue 136 for the third processor 124. Each read/write queue is generally similar and includes a first queue for read requests e.g. 138 and a second queue 140 for write requests received from the associated processor. Each read queue has its own queue index and each write queue also has its own queue index and each queue index identifies the respective queue.

The read/write queue module 130 is in communication with a scheduler 150. The scheduler 150 is responsible for scheduling the next highest priority request to be handled by a request processor 160. Request processor 160 is responsible for managing the state of the NorFlash 112 and also for sending commands to a serializer 180. Serializer 180 may be a typical single, quad or octo-serializer. Serializer 180 is in communication with NorFlash 112. Request processor 160 is also in communication with a command lookup table 170. Each NorFlash has its own set of command codes and the lookup table 170 is used to store codes for various commands to be sent by the request processor to serializer 180.

Request processor 160 is also in communication with status registers 190. Status registers 190 includes a set of status registers per master device, e.g. first to third sets of status registers 192, 194 and 196. Each set of status registers is also associated with a corresponding one of the read/write queues 132, 134, 136. Status registers 190 are also in communication with the processors and each processor can check the state of various operations being carried out or can clear pending interrupts and carry out various other operations commonly associated with status registers. For example a processor can check the status of a PROGRAM or ERASE operation associated with one of its WRITE requests.

In the particularly described embodiment, global scheduler 150 and request processor 160 are each implemented as respective finite state machines. Details of the finite state machines are provided in the following.

Parts of the SOC 110 may be implemented using generally conventional hardware and data processing devices, such as FPGAs, but specially configured or otherwise adapted to carry out the teaching of the present disclosure For example modules 130, 150, 160, 170 and 190 may be implemented using any suitable ASIC technology such as FinFET but it may be any CMOS technology or FPGA.

Figure 3:
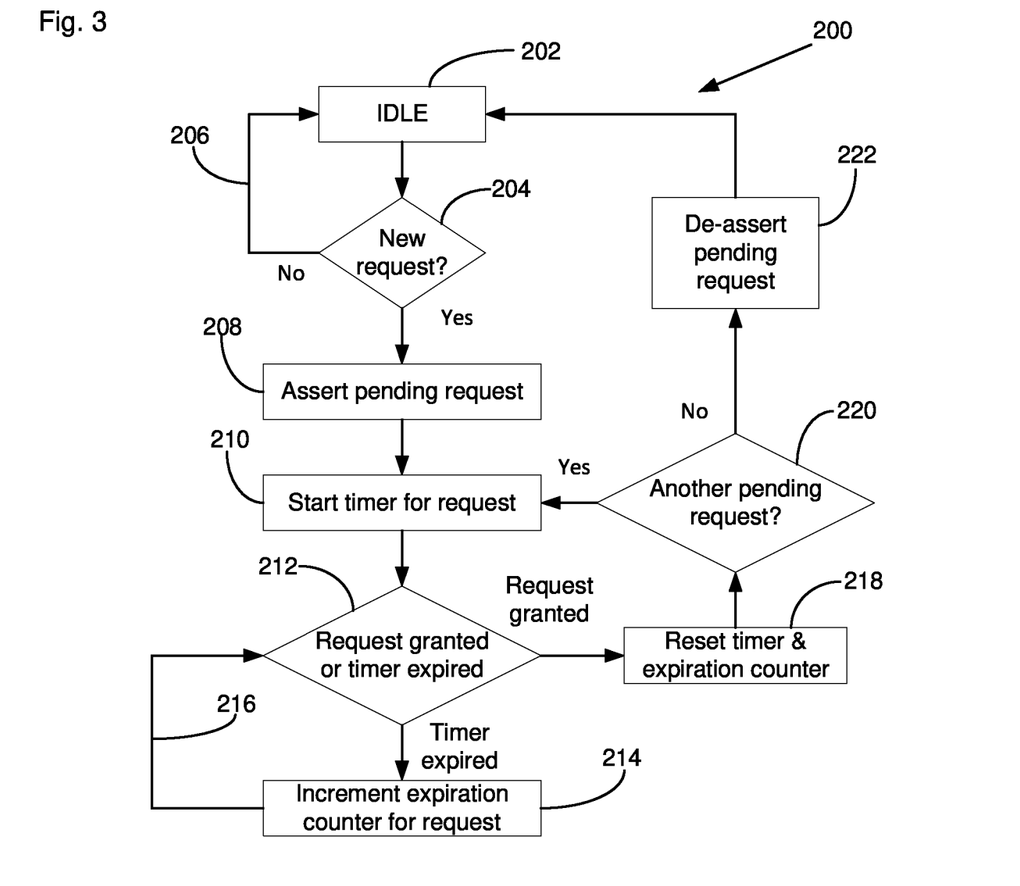
FIG. 3 shows a flow chart illustrating an expiration time management process used for each read and write que of the SOC illustrated in FIG. 2.

FIG. 3 shows a flow chart illustrating an expiration time management method 200 that may be carried out by each of the read/write queues 132, 134, 136. The same method 200 is used by each read queue and each write queue of the three pairs of read and write queues independently and in parallel but the following description will focus more on the operation of only a single queue.

As mentioned above each processor, e.g. processor 120, has its own pair of queues, e.g. 132, including one read queue 138 and one write queue 140. A read queue, e.g. 138, can accept up to #NB_READ requests, where #NB_READ is a parameter that may be defined at implementation stage and may be in the range of, for example, two to eight, and four may be particularly suitable ins some applications. A write queue, e.g. 140, can accept up to #NB_WRITE requests, where #NB_WRITE is a parameter that may be defined at implementation stage. Typically the value may be one as writing to NorFlash takes a relatively long time and so it may not be useful to queue several write requests for the same processor. A value of one may help to avoid too many write requests being pending in the system as they take longer to complete. However, in other embodiments the value may be greater than one.

Each read queue has an associated read request queue timer and similarly each write queue has an associated write request queue timer.

As illustrated in FIG. 3, a queue has a default idle state 202. If no request are pending then processing loops as illustrated by process flow line 206 until it is determined at 204 that the queue has received a new request. As soon as a queue receives a request, e.g. a read queue receives a read request or a write queue receives a write request, then the queue asserts a pending request event to the scheduler 150 at 208. If the scheduler 150 cannot immediately schedule that pending request because the request processor 160 is already processing another request, then the scheduler 150 monitors whichever pending request currently has the highest priority until the request processor 160 is ready to accept a new request.

As soon as the pending request event has been asserted to the scheduler at 208, a timer associated with the queue is started at 210 by receipt of the pending request. The timer determines how long a request can stay pending before that request is assigned a higher priority. Requests of the same type but in different queues can have different length timers associated with them and so requests in a queue with a shorter timer can overtake other requests of the same type in other queues with longer timers. Requests in the same queue are processed in the order that they arrived in that queue.

If the scheduler 150 manages to schedule the current request then the scheduler 150 notifies the queue that the request has been granted. At 212 the queue determines whether the request has been granted or whether the timer started by the request has expired. If at 212 it is determined that the request has been granted by the scheduler 150 then processing proceeds to 218. If the request has not been granted then at 212 it is also determined whether the queue timer for the request has expired yet. If the timer has expired before the request has been granted, then processing proceeds to 214 and an expiration counter for the request is incremented. Each queue includes an expiration counter for the type of request that the queue handles, e.g. either read requests or write requests. The queue timer is not restarted at 214, but rather the expiration counter is incremented each time a timer expires for any of the queues for the same type of request. Hence, initially the expiration counter increments owing to expiry of the timer of the queue of the pending request. The expiration counter may then also increment when the timer of another queues of the same type of request expires.

Processing then returns via 216 to 212 at which only the request granted path to 218 is possible after the timer has expired. However, the expiration counter for the request is also incremented each time a timer associated with a request of a queue of the same request type also expires. Hence, 214 increases an expiration counter, rather than starting a new timer, so that the scheduler 150 can determine, based on the expiration counter, which timer expired first and hence which of the pending request is the oldest, because it will have the highest expiration counter value. Hence, the scheduler 150 can serve requests in the order of timer expiration.

When a pending request is determined at 212 to have been granted, then processing proceeds to 218 and the timer started by receipt of the request is reset and the expiration counter for the request is also reset Then processing proceeds to 220 and the queue determines whether there are any pending requests. If there is a pending request then processing proceeds to 210 and the queue timer is started for that pending request at 210 and processing continues for that pending request as described above.

If it is determined at 220 that there are no pending requests remaining in the queue, then processing proceeds to 222 and the pending request event is de-asserted at 222 at the scheduler 150 so that the scheduler can determine that this queue no longer has any pending requests that needs scheduling. The process then returns to idle state 202 until a new request is received by the queue.

Figure 4:
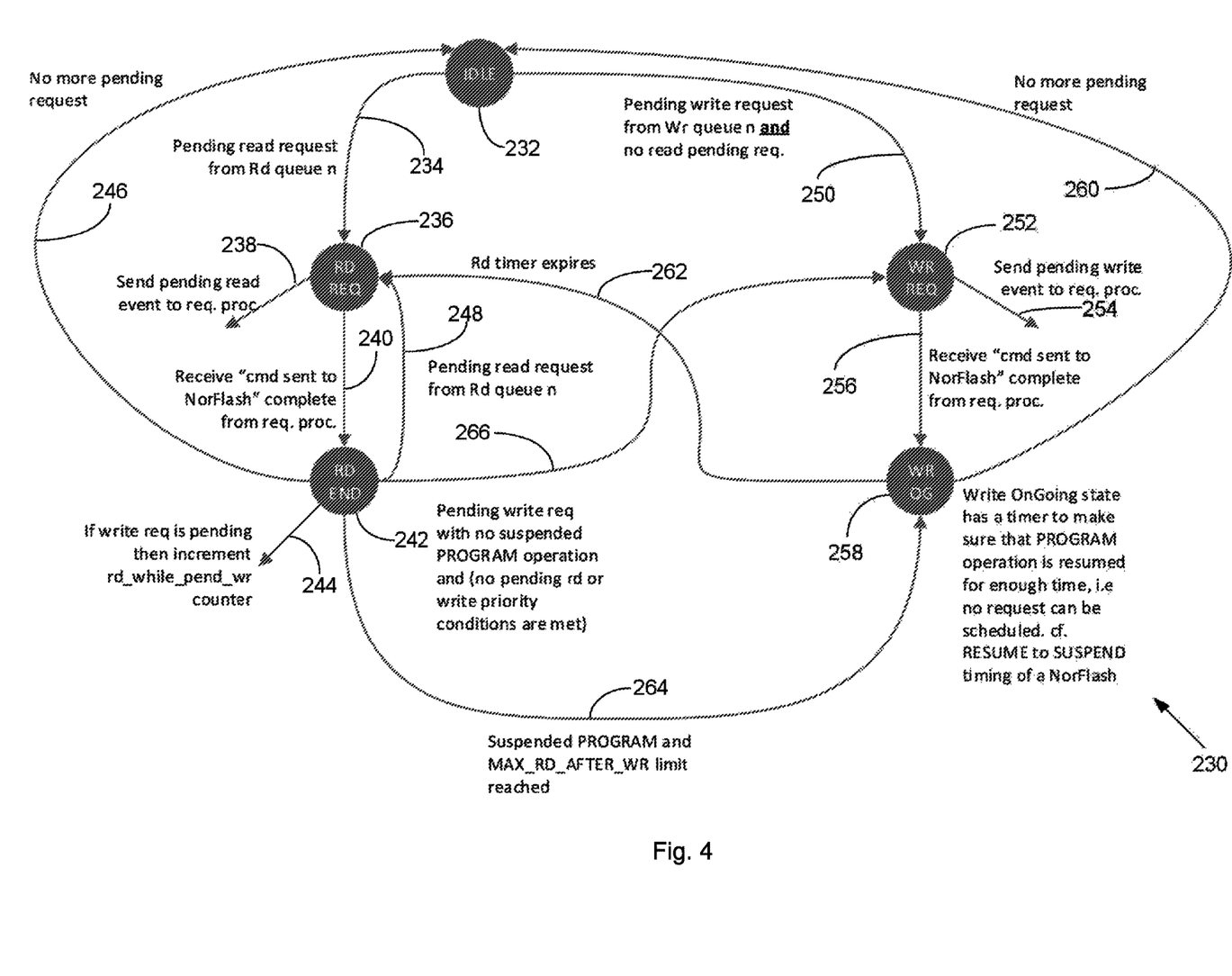
FIG. 4 shows a finite state machine diagram illustrating the global scheduler of the SOC illustrated in FIG. 2.

As noted above, the scheduler 150 may implement a finite state machine 230 as illustrated in FIG. 4. In FIG. 4 the circles indicate the states of the finite state machine 230 and the arrows between the states indicate the transitions and the associated text the transition conditions for each transition. The scheduler 150 may be considered a global scheduler as it schedules all of the requests for all of the masters of the system.

With reference to FIG. 4, the finite state machine 230 includes an IDLE state in which there are no pending request. Receipt of a pending read request from a one of the read queues asserting a pending read request for that queue causes a transition 234 to a READ_REQUEST state 236 in which a pending read event is sent 238 to the request processor 160. A transition 240 from the READ_REQUEST state 236 to a READ_END state 242 occurs if the scheduler receives confirmation that a command was sent to the NorFlash from the request processor indicating that the current read request has been completed. For example an Advanced High-Performance Bus (AHB) protocol and an on-chip AHB may be used to handle communication between the various parts of the NorFlash virtualisation circuitry. However, use of an AHB bus is not essential and an ad hoc interface may be used instead.

If a write request is currently pending during the READ_END state 242, then a counter of the number of read requests completed while a write request was pending (read_while_pendining_write) is incremented at 244.

If there are no more pending read requests or pending write requests, then the READ_END state may transition 246 back to the IDLE state 232. If there are any pending read requests, then the READ_END state 242 may transition 248 back to the READ_REQUEST state 236 on receipt of a pending read request assertion event form any one of the read queues.

From IDLE state 232 the scheduler 150 may transition 250 to a WRITE_REQUEST state 252 if there if a pending write request event has been asserted by any of the write queues and there are no pending read requests for any of the read queues, and in which a pending write event is sent 254 to the request processor 160. A transition 256 from the WRITE_REQUEST state 252 to a WRITE_ONGOING state 258 occurs if the scheduler receives a notification from the request processor indicating that a command was sent to the NorFlash and hence the current write request has been started and is ongoing. The WRITE_ONGOING state 258 has a timer associated with it to prevent exiting from this state for a period of time in order to make sure that a PROGAM operation on the NorFlash has been resumed for enough time so that no other request can be scheduled during that time.

If there are not more pending read requests or write requests then a transition 260 back to the IDLE state 232 may occur. Alternatively, if a read request timer for any of the read queues has expired then the WRITE_ONGOING state may transition 262 to the READ_REQUEST state 236 and then the scheduler may service the pending read request whose timer expired longest ago.

If in READ_END state 242 there is a suspended PROGRAM operation associated with a write request and the number of read request carried out after write request have been started has exceed some maximum value (MAX_RD_AFTER WR) then the scheduler may transition 264 back to the WRITE_ONGOING state 258 so that the PROGRAM operation may resume for a period of time. For example, for applications in which WRITES are less critical then MAX_RD_AFTER_WRITE may be set at 32. For applications in which WRITES are more critical then MAX RD AFTER WRITE may be lower, for example 8. Hence, taking the first example, up to 32 reads can take place after the last write has completed and before a next write is began.

Alternatively, if in READ_END state 242 there is a pending write request with no suspended PROGRAM operation associated with it, and there are either no pending read requests or write requests currently have higher priority than read requests, as discussed below, then the scheduler may transition 266 to the WRITE_REQUEST state 252 and start handling the oldest pending write request. Hence, a new write request is started, even if there is a pending read request, but the read_while_pending_write counter has exceeded indicates that starting a new write request has been delayed for a long time while read requests have been serviced. The system still has to schedule a write request that has been waiting for too long even if it keeps receiving read requests. Hence, the scheduler 150 is generally responsible for scheduling the next highest priority request to the request processor 160 and monitors all of the read queues and all of the write queues in parallel. The scheduler 150 generally enforces the following rules to determine which request current has the highest priority and hence is passed to the request processor 160:
  read requests generally have priority over write requests;
  write requests can be scheduled only is these is no ongoing PROGRAM operation, (as NorFlash does not support suspending a PROGRAM operation to trigger another one);
  write requests have higher priority than read requests in the following cases:
    a write timer has expired, and there is no expired read timer a write timer has expired, and its expiration counter is higher than the expiration counters for all read requests (unlikely to occur as activity will tend to be read dominated);
    if a maximum number of rd_while_pending_wr events have been scheduled while a write request with an expired timer is still pending (this ensures that the scheduler does not keep arbitrating for read requests, and if there is a suspended PROGRAM operation at that time, then a write will be scheduled to force the request processor to resume and complete the PROGRAM);
  as write requests are more time consuming, the scheduler holds write requests (whatever their state) for up to max_read_after_wr read requests that have been scheduled—if there are no pending read requests before this limit is reached then a pending write request is scheduled; between read requests, priority is as follows:
    a read request with an expired timer, and the highest expiration counter;
    if two or more requests have an expired timer and the same expiration counter, then round robin arbitration starting by lowest queue index value; if no expired timer, then round robin arbitration starting by lowest queue index value;
  between write requests, priority follows the same scheme as that above for read requests.

The request processor 160 not only sends commands to the serializer 180, but also manages the NorFlash memory (112) state to make sure that NorFlash memory (112) is ready to accept a new command, if there is an on-going ERASE or PROGRAM operation.

The behaviour of the request processor 160 depends on whether a read request or write request is pending. When a read request is pending, then any on-going PROGRAM or ERASE operation is suspended. When a write request is pending, then any on-going ERASE operation can be suspended. If a PROGRAM operation is on-going then the scheduler 150 does not schedule a write because the NorFlash memory (112) will not be able to handle it.

Figure 5:
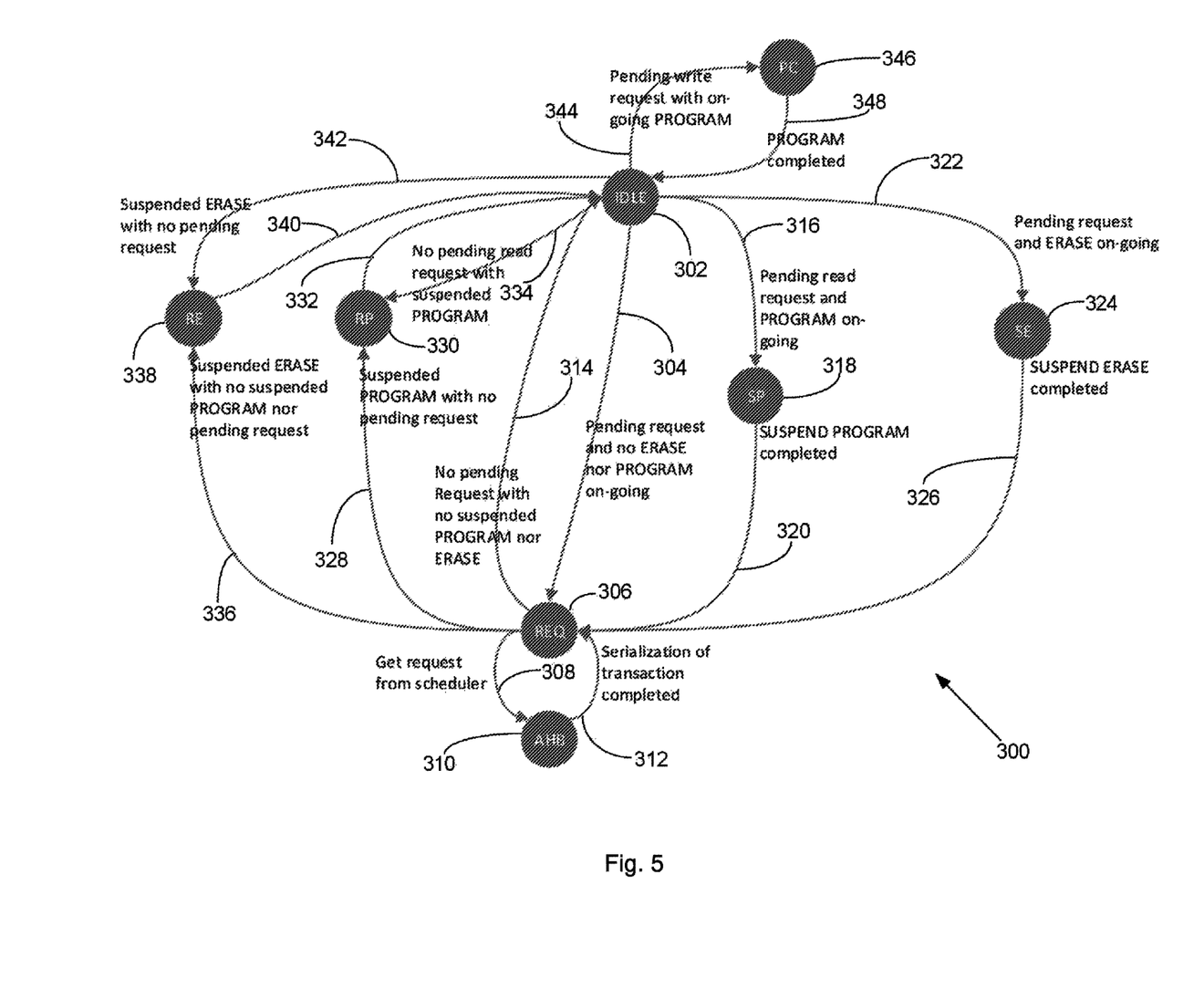
FIG. 5 shows a finite state machine diagram illustrating the request processor of the SOC illustrated in FIG. 4.

With reference to FIG. 5 there is shown a high-level finite state machine 300 which is implemented by the request processor 160.

The finite state machine 300 implemented by the request processor 160 include includes an IDLE state 302 in which the request processor waits for a new request from the scheduler 150. The request processor 302 transitions directly 304 to a REQUEST state 306 and get a scheduled request from the scheduler if there is a pending request and no ERASE operation ongoing or no PROGRAM operation ongoing. From the REQUEST state 306 the request processor can transition 308 to a SERIALIZER state 310 at which the request processor interfaces with the serializer 180 to send or receive any commands and/or data to/from the serializer 180.

As part of this, the request processor may also access the command look up table (LUT) 170 to access stored codes for the various commands that may need to be sent to the NorFlash memory 112 by the serializer 180. Generally, each NorFlash memory 112 may have its own set of command codes and these may be stored in command LUT 170 to enable the SOC 110 to be used with different types of external NorFlash 112. For example command LUT may store codes for some or all of the following: READ; ERASE; WRITE_EN; PROGRAM; PROGRAM_SUSPEND; ERASE_SUSPEND; PROGRAM_RESUME; ERASE_RESUME; and READ_STATUS. The command LUT 170 may also include other commands which are not particularly relevant to the present disclosure.

Once the serialisation transaction between the request processor 160 and the serializer 180 has completed, the request processor transitions 312 back to the REQUEST state 306. If there are no pending requests and no suspended PROGRAM operations nor ERASE operations, then the request processor 160 can transition 314 back to the IDLE state 302.

If there is a pending read request, and a PROGRAM operation is currently on-going, then the request processor 160 may transition 316 from the IDLE state 302 to a SUSPEND PROGRAM state 318 in which the PROGRAM SUSPEND command is sent to the NorFlash. The request processor may then transition 320 to the REQUEST state 306 once the PROGRAM SUSPEND command has been completed by the NorFlash 112. If there is a pending request of any type, and an ERASE operation is currently on-going, then the request processor 160 may transition 322 from the IDLE state 302 to a SUSPEND ERASE state 324 in which the ERASE SUSPEND command is sent to the NorFlash. The request processor may then transition 326 to the REQUEST state 306 once the ERASE SUSPEND command has been completed by the NorFlash 112.

The PROGRAM on-going and ERASE on-going status are internal to the request processor 160. NorFlash 112 is not probed regularly to keep them in sync against the real state of the NorFlash memory 112. Those statuses can be updated each time the request processor performs an access to the FLAG STATUS register of the NorFlash memory 112.

The state machine 300 can transition through the SUSPEND PROGRAM state or the SUSPEND ERASE state when not needed. The PROGRAM or ERASE operations may have been completed on the NorFlash side, but may still be on-going from the state machine point of view. In that case, the SUSPEND command is sent to the NorFlash memory but is ignored by the memory controller in the NorFlash memory.

If there is no pending read request and a PROGRAM operation is currently suspended, then the request processor 160 may transition 328 from the REQUEST state 306 to a RESUME PROGRAM state 330 in which the PROGRAM RESUME command is sent to the NorFlash. The request processor may then transition 332 to the IDLE state 302 once the PROGRAM RESUME command has been completed by the NorFlash 112.

The request processor may also transition 334 from the IDLE state 302 to the RESUME PROGRAM state 330 if there is no pending read request and a PROGRAM operation is currently suspended.

If there is no pending request of any type, a PROGRAM operation is not currently suspended, and an ERASE operation is currently suspended then the request processor 160 may transition 336 from the REQUEST state 306 to a RESUME ERASE state 338 in which the ERASE RESUME command is sent to the NorFlash. The request processor may then transition 340 to the IDLE state 302 once the ERASE RESUME command has been completed by the NorFlash 112.

The request processor may also transition 342 from the IDLE state 302 to the RESUME ERASE state 338 if there is no pending read or write request and an ERASE operation is currently suspended.

The request processor may also transition 344 from the IDLE state 302 to a PROGRAM COMPLETING state 346 if there is a pending write request and a PROGRAM operation is currently on-going on the NorFlash 112. The PROGRAM completing state 346 is used to force completion of a PROGRAM operation because there is a pending write request which has been waiting in the scheduler 150 for too long. Once the PROGRAM operation has completed, the request processor can transition 348 back to the IDLE state 302.

Figure 6:
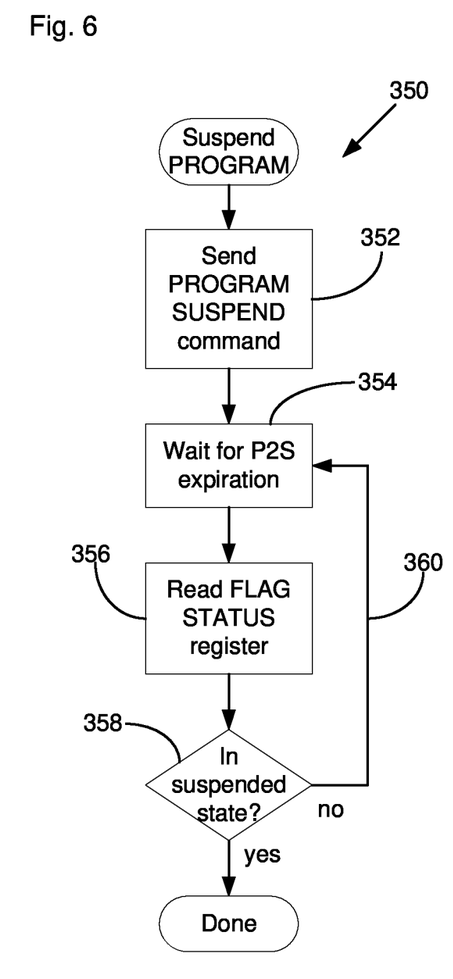
FIG. 6 shows a flow chart illustrating a method by which the request processor suspends a PROGRAM operation.

With reference to FIG. 6 there was shown a flowchart illustrating a suspend program method 350 carried out by the request processor 160 in the suspend program state 318. The request processor looks up the program suspend command code from command LUT 170 and the serializer 180 sends the program suspend command to the NorFlash 112 at 352. At 354, the request processor waits for a program to suspend period to expire corresponding to the latency in the program operation being suspended by the NorFlash 112. At 356, the request processor can read the flagged status register of the NorFlash 112 to determine whether the flagged status register entry indicates that the program operation has been suspended. If at 358 it is determined that the NorFlash is not in a suspended state, then process flow can return, as illustrated by process flow line 360, to 354 at which the request processor waits further. When it is determined at 358 that the program operation the NorFlash has been suspended, then the send program method 350 is completed.

In an alternative embodiment, operation 356, 358, and 360 may be omitted, by changing a setting in a configuration register so that the P to S period is set to a worst case latency. If the worst case latency is much higher than a typical latency, then the P to S period can be set to a typical latency and the hardware may poll the flag status register of the NorFlash to determine if the program operation has been suspended.

Figure 7:
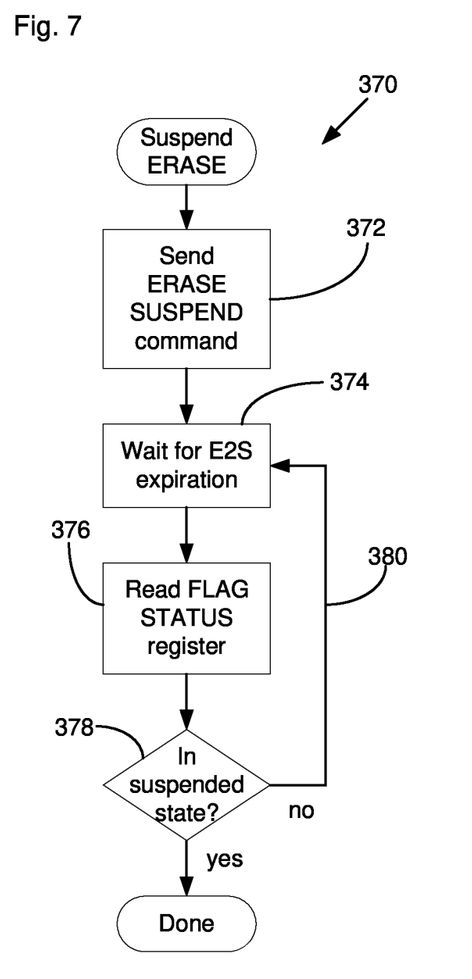
FIG. 7 shows a flow chart illustrating a method by which the request processor suspends an ERASE operation.

FIG. 7 shows a flowchart similar to that shown in FIG. 6 illustrating a suspend erase method 370 carried out by the request processor in the suspend erase state 324. The method is generally similar to that for the suspend program method other than suspending an erase operation rather than a program operation of the NorFlash. At 327, an erase suspend command is sent to the NorFlash and at 374 a weight corresponding to the latency of the erase operation suspension is carried out. At 376 the flag status register of the NorFlash is read to determine if the erased operation has been suspended. If the erase operation has not been suspended then processing flows as illustrated by line 380 and a further weight is carried out at 374. Otherwise, when it is determined that the erase operation has been suspended at 378, then the suspend erase method 370 is completed. Similarly, operations 376, 378 and 380 may be omitted as for the suspend program method 350.

Figure 8:
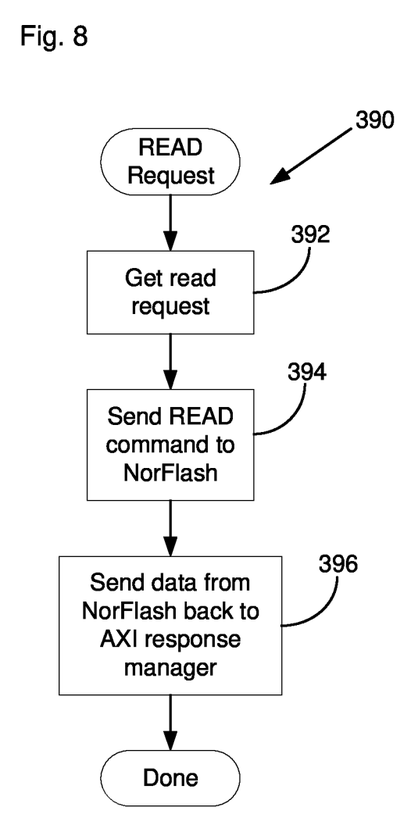
FIG. 8 shows a flow chart illustrating a method by which the request processor handles a READ request.

FIG. 8 shows a flowchart illustrating how a read operation is carried out by the request processor 160. The read request handling method 390 involves the request processor 160 receiving a read request from the request scheduler 150 at 392. When the request processor reaches the request state 306 then at 394 a read command is sent to NorFlash 112 via serializer 180. At 396 the request processor 160 receives the data from the NorFlash 112 via serializer 180 and returns the data to the interface 126 to be routed to the corresponding master processor that originated the read request. The read request handling method 390 is then complete.

Figure 9:
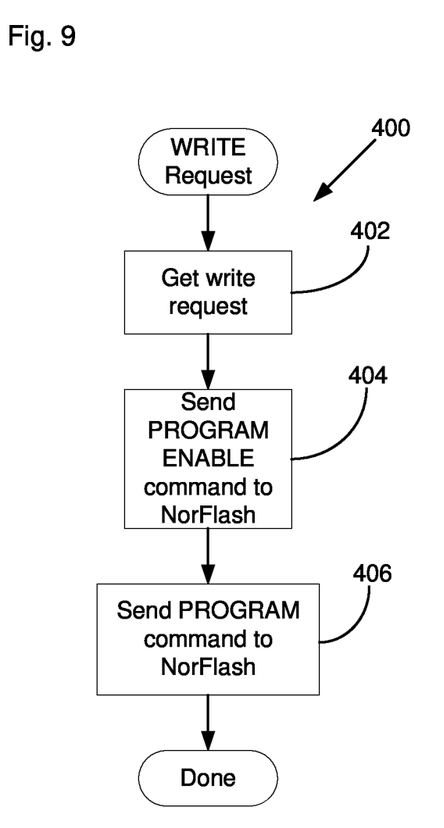
FIG. 9 shows a flow chart illustrating a method by which the request processor handles a WRITE request.

FIG. 9 shows a flowchart illustrating a write request handling method 400 carried out by the request processor 160. The request processor 160 receives a write request from scheduler 150 at 402. When the request processor arrives at request state 306 then a program enable command is sent to the NorFlash via serializer 180. Then a program command to write the data to the NorFlash is sent via serializer 180 at 406. The write request handling method 400 is then complete.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Any instructions and/or flowchart steps can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

While the disclosure is amenable to various modifications and alternative forms, specifics thereof have been shown by way of example in the drawings and described in detail. It should be understood, however, that other embodiments, beyond the particular embodiments described, are possible as well. All modifications, equivalents, and alternative embodiments falling within the scope of the appended claims are covered as well.

The invention claimed is:

1. A system on a chip configured to use an external NorFlash memory, wherein the system on a chip comprises:
    a plurality of master devices; and
    NorFlash virtualising circuitry configured to suspend a program operation or an erase operation being carried out on the external NorFlash memory, permit a read operation to be carried out on the NorFlash memory and resume the suspended program operation or erase operation, wherein each master device of the plurality of master devices is configured to operate as a master to independently access the external NorFlash memory, wherein the NorFlash virtualising circuitry comprises a plurality of pairs of queues, each pair of queues associated with a respective one of the plurality of master devices, and each pair of queues comprises: (a) a read request queue arranged to receive read requests from the respective one of the plurality of master devices, and (b) a write request queue arranged to receive write requests from the respective one of the plurality of master devices, wherein each read request queue has a read request timer associated therewith, and wherein each read request queue is configured to:

increase a read request timer expiration counter if the read request that started the read request timer is not scheduled before the read request timer expires; and further increase the read request timer expiration counter each time another read request timer associated with another read request queue expires.

2. The system on a chip as claimed in claim 1, wherein each read request queue is further configured to reset the read request timer if the read request that started the read request timer is scheduled before the read request timer expires.

3. The system on a chip as claimed in claim 1, wherein the NorFlash virtualising circuitry includes a scheduler configured to schedule a next highest priority request from at least one of a plurality of read requests or a plurality of write requests from the plurality of master devices.

4. The system on a chip as claimed in claim 3, wherein the scheduler is configured to determine which of the plurality of read requests or the plurality of write requests is the next highest priority request based on one or more of:

read requests having priority over write requests;

a write request only being scheduled if there is no ongoing program operation on the external NorFlash memory;

a write request having higher priority than a read request, if:
 a write request timer has expired and no read request timer has expired; or
 a write request timer has expired and an associated write request timer expiration counter is greater than any read request timer expiration counter; or
 a write request timer of a write request having expired and the write request having higher priority than a read request if the number of read requests that have been scheduled after a last write request exceeds a maximum.

5. The system on a chip as claimed in claim 1, wherein the NorFlash virtualizing circuitry further comprises a request processor which handles a current highest priority request, and wherein the request processor is configured to:

suspend any program operation or erase operation that is currently ongoing on the external NorFlash memory when the current highest priority request is a read request; and suspend any erase operation that is currently ongoing on the external NorFlash memory when the current highest priority request is a write request.

6. The system on a chip as claimed in claim 5, wherein the request processor is further configured to:

complete any program operation that is currently ongoing on the external NorFlash memory when there is a write request that has not been scheduled for a time greater than a maximum pending time.

7. The system on a chip as claimed in claim 5, wherein the request processor is further configured to suspend a program operation currently ongoing on the external NorFlash memory, by causing a suspend program command to be sent to the external NorFlash memory and then waiting for the program operation to be suspended.

8. The system on a chip as claimed in claim 7, wherein the request processor is further configured to suspend an erase operation currently ongoing on the external NorFlash memory, by causing a suspend erase command to be sent to the external NorFlash memory and then waiting for the erase operation to be suspended.

9. The system on a chip as claimed in claim 1, wherein the NorFlash virtualizing circuitry further comprises a command look up table storing a plurality of NorFlash command codes for a plurality of NorFlash commands for the external NorFlash memory and wherein the plurality of NorFlash commands includes one or more of: read, erase, write enable, program, program suspend, erase suspend, program resume, erase resume, and read status.

10. The system on a chip as claimed in claim 1, wherein the NorFlash virtualizing circuitry further comprises a plurality of sets of status registers, each set of status registers being for a respective master device of the plurality of master devices.

11. The system on a chip as claimed in claim 1, wherein each write request queue is configured to increase a write request timer expiration counter if the write request that started a write request timer is not scheduled before the write request timer expires, and to further increase the write request timer expiration counter each time another write request timer associated with another write request queue expires.

12. An electronic system, comprising:
 the system on a chip of claim 1; and
 the external NorFlash memory in communication with the system on a chip.

13. The system on a chip as claimed in claim 1, wherein each write request queue is configured to reset a write request timer if the write request that started the write request timer is scheduled before the write request timer expires.

14. A system on a chip, comprising:
 a first master device configured as a first NorFlash master;
 a first read request queue arranged to receive NorFlash read requests from the first master device;
 a first write request queue arranged to receive NorFlash write requests from the first master device;
 a second master device configured as a second NorFlash master;
 a second read request queue arranged to receive NorFlash read requests from the second master device;
 a second write request queue arranged to receive NorFlash write requests from the second master device;
 a scheduler configured to communicate with the first read request queue, the first write request queue the second read request queue, and the second write request queue, and further configured to schedule which pending read request or pending write request is a current highest priority request;
 a request processor configured to communicate with the scheduler and to issue commands to an external NorFlash memory to permit the current highest priority request to be carried out by the external NorFlash; and
 a timer and a timer expiration counter associated with each respective request queue, wherein each request queue is configured to increment its associated timer expiration counter if a request that started its associated timer is not scheduled before the associated timer expires, and wherein each request queue is further configured to increase its associated timer expiration counter each time another timer associated with another request queue of the same request type expires.

15. The system on a chip as claimed in claim 14, wherein the request processor is further configured to suspend an ongoing erase operation or ongoing program operation of the external NorFlash memory when the current highest priority request is a read request.

16. The system on a chip as claimed in claim 15, wherein the request processor is further configured to resume the suspended erase operation or to resume the suspended program operation after the read request has been completed.

17. The system on a chip as claimed in claim 16, further comprising a command look up table configured to communicate with the request processor, wherein the command look up table stores a plurality of command codes each corresponding to a different command that can be sent to the external NorFlash memory.

18. The system on a chip as claimed in claim 14, wherein the scheduler implements a first finite state machine, and the request processor implements a second finite state machine.

\* \* \* \* \*